United States Patent [19]

Dohmeier

[11] 4,128,446

[45] Dec. 5, 1978

[54] METHOD FOR EMBEDDING TIRE CHAINS IN THE TREAD PORTION OF A TIRE

[75] Inventor: Hans O. Dohmeier, Johannesburg, South Africa

[73] Assignee: Dome Inventions (Proprietary) Limited, Johannesburg, South Africa

[21] Appl. No.: 761,540

[22] Filed: Jan. 21, 1977

[30] Foreign Application Priority Data

Feb. 16, 1976 [ZA] South Africa ............... 76/0914

[51] Int. Cl.² ........................................... B29H 17/38
[52] U.S. Cl. .................................. 156/114; 152/169; 152/211; 156/96
[58] Field of Search ............... 156/96, 110 R, 114, 156/123 R, 128 R; 152/169, 208, 210, 211, 239

[56] References Cited

U.S. PATENT DOCUMENTS

| | | | |
|---|---|---|---|
| 1,334,110 | 3/1920 | Moriarty | 152/210 |
| 2,479,474 | 8/1949 | Crooker | 152/211 |
| 2,610,357 | 9/1952 | Hawkinson | 152/211 |
| 2,910,104 | 10/1959 | Billingsley | 152/211 |
| 3,236,709 | 2/1966 | Carver | 156/96 |
| 3,565,716 | 2/1971 | Felker | 156/114 |
| 3,607,497 | 9/1971 | Chrobak | 156/95 |
| 3,689,337 | 9/1972 | Schelkmann | 156/96 |
| 3,722,566 | 3/1973 | Dohmeier | 152/169 |
| 3,919,020 | 11/1975 | Floto | 156/96 |

*Primary Examiner*—John E. Kittle
*Attorney, Agent, or Firm*—Young & Thompson

[57] ABSTRACT

A tire having a layer of uncured rubber in its tread portion is fitted to a hub and an annular protective chain is placed over the uncured rubber. The tire is inflated and the protective chain is tensioned by chains connected to the lateral edges of the chain and extending radially inwardly to the axis of and axially away from the central plane of the tire by means of a telescopic jack aligned with the axis of the tire. The tire is vulcanised by sealably enclosing it in a cover, venting the space between the cover and tire, and curing the rubber in an autoclave in which the tire is a loose fit.

6 Claims, 5 Drawing Figures

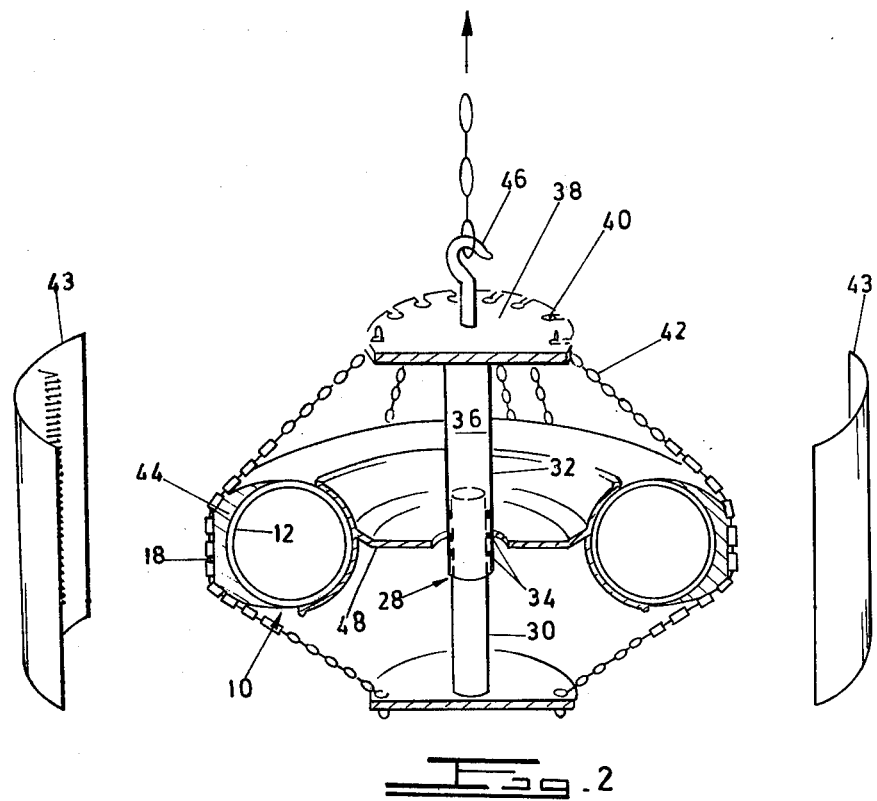
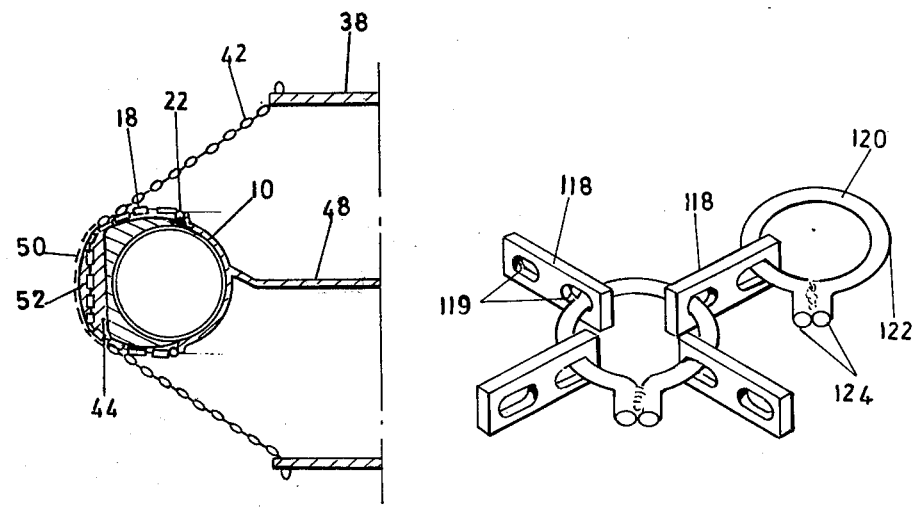

METHOD FOR EMBEDDING TIRE CHAINS IN THE TREAD PORTION OF A TIRE

This invention relates to a method for embedding a protective chain in the tread portion of a tyre.

It has been found that a rubber tyre having a chain network of steel elements embedded in its tread portion has excellent wearing properties when used in mining or other earthmoving operations where sharp rocks are present. The reason for this is that the protective chain and rubber form a matrix. In the matrix the rubber holds the chain links against relative rotation, which might cause the chain to break, and prevents the chain from abrading the rubber as occurs when the chain is not embedded in the rubber. The chain provides a protective web which prevents the rubber from being cut and abraded by sharp rocks.

South African Pat. No. 70/1340 discloses such a tyre and proposes a method of embedding a protective chain in the tread portion of a tyre. The method includes the steps of fitting the protective chain over a layer of uncured rubber forming the tread portion of the tyre, and pressure rolling the protective chain to force it into and embed it in the uncured rubber. The rubber is then cured. Heat may be applied during pressure rolling to assist in embedding the protective chain.

This method is costly, because of the expensive nature of the pressure rolling equipment used and because an operator is required throughout the embedding process. It has been found that it is extremely difficult to apply the heat to the rubber to soften it to facilitate embedding.

It is an object of the invention to provide a method of embedding a protective chain in the tread portion of a tyre which satisfactorily overcomes the disadvantages of the disclosed method.

According to the invention there is provided a method of embedding an open network protective chain having wearing members and connectors interconnecting the wearing members at least partially into the tread portion of a tyre having a casing and a tread portion, including the steps of fitting the protective chain over a layer of uncured rubber forming part of the tread portion of the tyre and forcing the protective chain into the uncured rubber with the improvement of mounting the tyre on a hub; fitting the protective chain to the tyre, the tyre being uninflated and the protective chain being annular; inflating the tyre until it is firm; and uniformly and simultaneously around the circumference of the tyre urging the protective chain towards the axis of the tyre to force it into the uncured rubber, heat being applied to the protective chain and the rubber while the chain is being embedded.

In one form of the invention symmetrically positioned cables extending from the edges of the protective chain towards the axis of the tyre are tensioned to pull the protective chain into the rubber.

In another form of the invention an annular web, which may be continuous or segmental, is placed over the protective chain and is pulled towards the axis of the tyre by means of symmetrically positioned cables or chains which extend from the web towards the axis of the tyre. In this form of the invention a further layer of rubber may be positioned between the protective chain and the web, this further rubber layer being forced into the interstices in the protective chain network while the chain is being urged into the first-mentioned layer of rubber. The web may be a mesh, a series of metal plates, flexible belting and the like.

The heat is preferably applied by means of intra-red radiators positioned circumferentially around the tyre. In the first form of the invention mentioned above the heat is applied directly to the rubber and to the protective chain. In the second form the heat is applied directly or indirectly through the web depending on the nature of the web used. In practice, since the material of the protective chain is a good heat conductor the whole chain is heated; where the surfaces of the protective chain contact the rubber, the rubber softens considerably and there is partial bonding between the protective chain and the rubber.

In order to ensure that the protective chain is uniformly embedded in the rubber, particularly in the central zone of the tread, the invention provides that the side wall portions of the protective chain to either side of the central zone or the edge portions of the web are pulled axially in a direction away from the central plane of the tyre as well as towards the axis of the tyre.

Preferably the rubber of the tread is rounded in cross-section. This assists uniform embedding of the protective chain.

The apparatus for at least partially embedding a protective chain in the tread portion of a tyre having a casing and a tread portion, comprises a plurality of similar flexible, substantially inextensible, elongate elements connectable to each edge of the protective chain or to a web positioned on the protective chain on its side remote from the tyre to extend inwardly towards the axis of the tyre, and means to tension the elongate elements.

Preferably the tensioning means is a jack aligned with the axis of the tyre, each end of the jack being connected to the elongate elements on one side of the tyre.

The invention is further discussed with reference to the accompanying drawings, in which:

FIG. 2 shows a schematic perspective view, partially in section, of one embodiment of apparatus for embedding a protective chain in the tread portion of the tyre;

FIG. 3 shows a section through a variant of the embodiment of FIG. 2;

FIG. 4 shows a perspective view of part of a preferred form of tyre protective chain.

In the drawings like parts are similarly numbered.

Figure 1:
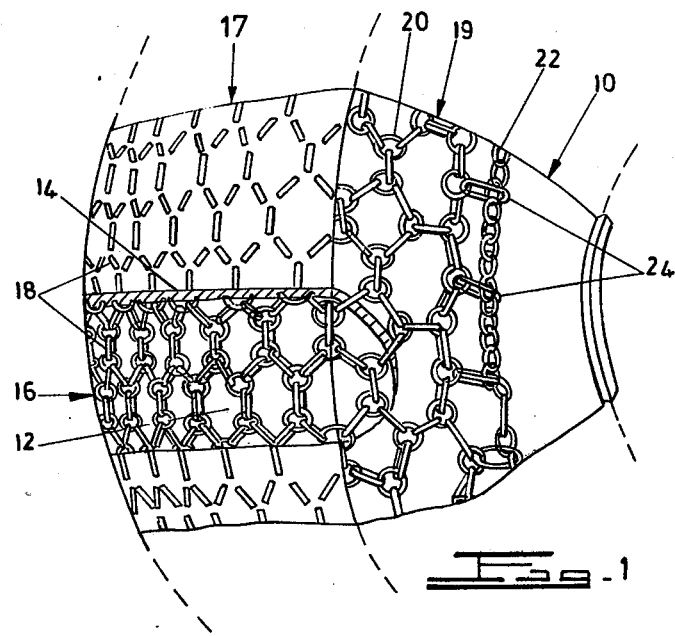
FIG. 1 shows a partially cut away perspective view of a portion of tyre having a protective chain embedded in its tread portion.

In FIG. 1 there is shown a tyre 10 having a casing 12 and a tread portion 14. A protective chain 16 comprising an open network of steel links 18 and ring-shaped connectors 20 has a tread part 17 partially embedded in the tread portion 14 and has side parts 19 extending outside the tread portion along a portion of the side wall of the tyre 10. A tensioning chain 22 is connected to the edges of the sides of the protective chain 16 by loops 24 to tension the chain 16 and to hold the side portions of the chain 14 firmly against the side wall of the tyre. The links 18 are perpendicular to and the connectors 20 are parallel to the surface of the tyre 10. The outer edges of the links 18 are flush with the surface of the tread and form a tread pattern for the tube. Three links 18 are connected to each connector 20.

In FIG. 2 an apparatus for embedding a tyre chain 16 in a tyre 10 includes a jack 28 comprising a telescopic piston 30 and cylinder 32 arrangement, connecting discs 38, and chains 42. The cylinder 32 is sealed at one end and is engaged with the piston by means of sealing rings 34, shown schematically, to define within it a chamber 36 which can be pressurised by hydraulic or pneumatic fluid. At each end of the jack 28 there is a connecting disc 38 the periphery of which is uniformly perforated with keyhole slots 40 each shaped to receive and lock on to a chain 42. Each chain 42 is secured to the edge of a side wall portion of the protective chain. Between the chain and the casing or carcass of the tyre is a layer of uncured rubber 44.

The upper disc 38 is provided centrally with a hook 46 by means of which the apparatus and the tyre can be suspended from an overhead support (not shown).

The tyre 10 is mounted on a hub 48 that has a central hole to accommodate the jack 28 therethrough.

Infra-red heaters 43, of any commercially available type, are positioned around the periphery of the tyre.

In practice a protective chain is embedded in the tread portion of a tyre as follows.

The tyre with an inner tube inside it is mounted on the hub 48. The tyre has a tread portion of uncured rubber 44 bonded to it, the tread portion being arcuate or crescent-shaped in cross-section, i.e. the edges are buffed.

A protective chain, which is annular and which has been cleaned by pickling or the like, is placed or forced around the periphery of the uninflated tyre and is connected to the discs 38 by chains 42 while the jack is in its collapsed state and the tyre is deflated. The diameter of the annular chain is such that when embedded and the tyre is inflated it will have only a small degree of circumferential slack. The tyre is then inflated until it is firm. In practice the pressure is considerably above the normal working pressure of the tyre. For example, for a heavy-duty earth-moving vehicle tyre the pressure would be in the region of 310 to 620 kilo pascals depending on the type of tyre. About 400 kilo pascals has been used in practice.

The apparatus and tyre are then lifted off the ground using the hook 46. At this stage the jack is pressurised and expanded with a force of about 20 tonnes while the rubber and chain are heated by the infra-red heaters 43. The pull of the chains 42 urges the tyre protective chain 16 into the rubber 44.

The force applied by the jack is most effective when the chains 42 are at an angle of about 45° to the general plane of the tyre. For this reason the embedding of the chain is done in two stages. In the first stage the jack is expanded so that the chains 42 move from about 30° to about 60° inclination to the general plane of the tyre; at this stage the chain is partially embedded into the uncured rubber. The jack is then collapsed and the chains 42 shortened until their angle with the plane of the tyre is again about 30°. The jack is then once again expanded. Adjusting the lengths of the chains 42 is accomplished simply by engaging one of the links in the keyhole slots in the disc 38. Alternatively turnbuckles or other arrangements could be used. Lifting the apparatus off the ground ensures that the tensions of the upper and lower chains 42 are roughly equal.

The force applied to the chain is distributed equally circumferentially around the tyre so that the force applied to embed the chain is uniform.

In tests made to date it has been found that practically any type of rubber, either natural or synthetic conventionally used for the tread portion of a tyre, can be used for the invention. The uncured rubber may be completely uncured (i.e. that known as "green stock") or be partially cured. During embedding it has been found that a surface temperature of the rubber of about 100° C. is suitable to permit forcing of the protective chain into the rubber and to obtain a degree of bonding of the rubber to the chain.

After embedding, the tyre is allowed to cool for about 2 to 4 hours and then is cured or vulcanised in any conventional manner.

It has been found that inflating the tyre after the chain has been fitted to it serves to take up most of the circumferential slack. Any remaining slack is taken up by tightening the tensioning chain 22; while this distorts the chain pattern slightly, this is advantageous as it causes the links 18 firmly to abut against the rubber.

In FIG. 3 a similar apparatus to that described above and shown only partially is used. In this variant of the invention the protective chain is not directly connected to the disc 38 on the jack 28. Instead, the protective chain is fitted to the tyre over a thin layer of uncured rubber 44 and is held in place by a tensioning chain 22 in a manner similar to that shown in FIG. 1.

A web 50 may be a mesh, flexible belting or a series of arcuate metal plates is fitted over the protective chain 18 on its side remote from the tyre and is connected by the chain 42 to the discs 38.

Embedding of the protective chain is essentially the same as previously discussed except that the web 50 is pulled to urge the protective chain 16 into the uncured rubber rather than the protective chain being pulled directly by the chains 42 into the rubber.

Also shown in FIG. 3 is an outer layer of rubber 52 which is positioned between the web 50 and the protective chain. During embedding this rubber layer 52 is forced into and through the interstices in the chain network to bond with the base rubber layer 44.

In a variant of the invention the apparatus and methods of FIGS. 2 and 3 are combined. In this event a protective chain is first embedded in the tread portion of a tyre in the manner described with reference to FIG. 2. This causes rubber to be extruded through the interstices in the chain network and form dome-shaped protuberances projecting away from the tyre beyond the protective chain. While the rubber is still hot, i.e. about 100° C., a web 50 is placed around the tyre and tensioned in the manner described with reference to FIG. 3. This causes the protruding rubber to be forced backwards towards and into the chain so that the chain 16 is firmly secured to the tyre. During this process the chain 16 is held in position by a tensioning chain 22.

While the invention has been discussed above with particular reference to an hydraulic or pneumatic jack for tensioning the chains 42 it will be appreciated by persons skilled in the art that the jack can be mechanical, for instance a screw jack. Alternatively the jack can be replaced by a stiff inextensible rod and the chains tensioned by rotating the rod and tyre relatively to each other; this is not really suitable, however, as tearing or shearing of the rubber 44 will most likely occur. As a further alternative the rod or jack may be dispensed with and the chains 42 tensioned by securing the lower disc 38 to a floor and lifting the upper disc by means of a hook; this might result in uneven tensioning of the upper and lower chains 42 as a result of the weight of the tyre and consequently uneven embedding of the protective chain 18 laterally across the cross-section of the tread.

FIG. 4 shows a preferred form of protective chain 16 which comprises a network of links or wearing plates 118 that are arranged to be perpendicular to the surface of the tyre and connectors 120 that will be substantially parallel to the surface of the tyre. Four links 118 are connected to each connector 120 to form a network with a quadrilateral pattern with the connectors 120 being threaded through slots 119, two of which are formed in each link 118. The links are of a carbon steel and are hardened to about 52–54 Rockwell C-scale. The connectors 120 are rods bent to form loops 122 with outwardly projecting limbs 124 that are welded to each other. The slots 119 in the links 118 accommodate lateral and circumferential slack in the chain after it has been embedded. Furthermore, the slots 119 permit relative pivotal movement between the links 118 and the connectors 120 both in the plane of and perpendicular to the plane of the surface of the tyre at any point. Instead of having the limbs 124 of the connectors 120 as shown, the limbs may and preferably do, overlap in the loop 120. The dimensions of the links and connectors can be varied to change the density or mesh opening of the network.

The tyre with the protective chain embedded in the uncured rubber of the tread portion can be vulcanised using conventional apparatus and techniques. However, it has been found to be difficult to fit and use conventional moulds because a tight fit of the tyre in the mold might damage the mould and a loose fit results in a poor finish for the tyre. The apparatus shown in FIG. 5 solves this problem and permits a standard mould to be used for a wide range of tyres.

Figure 5:
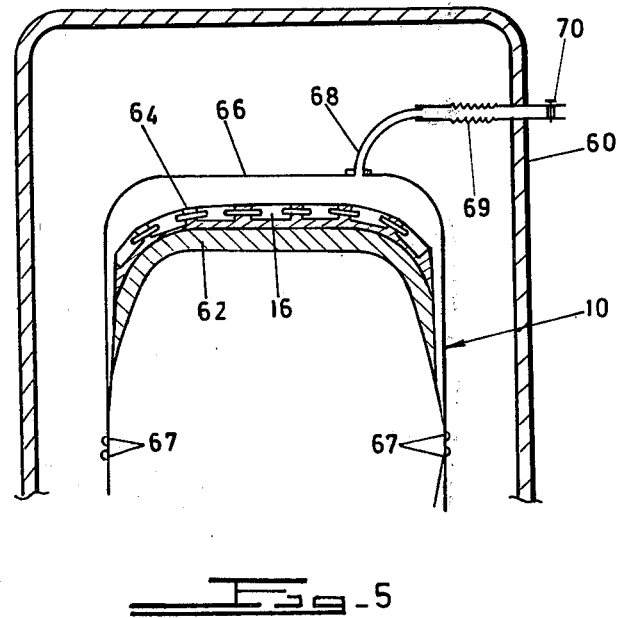
FIG. 5 shows schematically a section through a tyre and apparatus for curing the tyre.

FIG. 5 shows schematically in section a portion of a tyre 10 in an autoclave 60. The tyre 10 includes a casing having a layer of cured or partially cured rubber 62 and a protective chain 16 embedded in a layer of uncured rubber or "green stock" 64. A cover 66 of plastics or rubber sheet material surrounds the tyre 10 and is sealed to the walls of the tyre at 67. A tube 68 is bonded to the cover 66 and is connected to a flexible tube 69 that passes through the autoclave 60 and that has a valve 70 outside the autoclave.

In practice the tyre is vulcanised as follows using the apparatus of FIG. 5. Firstly the tyre is mounted on a hub and inflated, the cover 66 is sealed to the walls of the tyre 10, and the tyre placed in the autoclave. The space between the cover and the tyre 10 is vented to atmosphere through the tubes 68, 69. The autoclave is pressurised and heated by passing steam through it, the tyre remaining in the autoclave for a time sufficient to cure the uncured and partially cured rubber. The cover prevents steam contacting the rubber and, by being forced against the chains and rubber, gives the product a moulded finish.

The parameters used during vulcanising are as follows. The inflation pressure of the tyre is about 600 kilo pascals and the pressure in the autoclave is between 480 and 585 kilo pascals and preferably between 520 and 555 kilo pascals; the tyre pressure is higher than the autoclave pressure so that the tyre does not collapse. The autoclave temperature is in the range 120° to 150° C. with a preferred range being 123° to 128° C. Curing time is 2 to 4 hours depending on the size of the tyre, the thickness of the uncured rubber, the types of rubber and the curing temperature used.

I claim:

1. In a method of embedding an open network protective chain having wearing members and connectors interconnecting the wearing members at least partially into the tread portion of a tire having a casing and a tread portion, including the steps of fitting the protective chain over a layer of uncured rubber forming part of the thread portion of the tire and forcing the protective chain into the uncured rubber; the improvement of mounting the tire on a hub; fitting the protective chain to the tire, the tire being uninflated and the protective chain being annular; inflating the tire until it is firm; connecting a plurality of flexible, substantially inextensible, elongate elements on each side of the tire to the protective chain at regularly spaced locations to project radially inwardly towards the axis of the tire and outwardly from the adjacent side of the tire; tensioning the elongate elements to apply a radially inwardly directed force to the protective chain thereby uniformly and simultaneously at all circumferential locations of the tire to urge the protective chain into the layer of uncured rubber; and applying radiant heat to the protective chain and the uncured rubber to soften the rubber to permit embedding of the protective chain while the elongate elements are being tensioned.

2. A method as claimed in claim 1, in which the protective chain comprises a tread portion and sidewall portions flanking the tread portion and in which the flexible, substantially inextensible, elongate elements on each side of the tire are connected to the lateral edges of the side-wall portions of the chain.

3. A method as claimed in claim 1, in which the protective chain is forced into the uncured rubber to cause some of the uncured rubber to be extruded through the chain and to project radially outwardly from it, and in which this extruded rubber is then forced radially inwardly into the chain firmly to hold the chain in position.

4. A method as claimed in claim 3, in which the extruded rubber is forced radially inwardly into the chain by placing a flexible annular web over the protective chain on its side remote from the axis of the tire; on each side of the tire, connecting a plurality of flexible, substantially inextensible, elongate elements to the lateral edges of the web to extend towards the axis of the tire; and tensioning the elongate elements to cause the web to contract circumferentially and force the extruded uncured rubber into the interstices of the protective chain.

5. A method as claimed in claim 1, in which the elongate elements extend at an inclination of between 30° and 60° to the axis of the tire.

6. A method as claimed in claim 1, in which the rubber and chain are heated to about 100° C.

* * * * *